United States Patent [19]

Krinickas, Jr.

[11] Patent Number: 4,975,670
[45] Date of Patent: Dec. 4, 1990

[54] AIR COOLED TRANSFORMER

[75] Inventor: Alexander Krinickas, Jr., Rockford, Ill.

[73] Assignee: Sundstrand Corporation, Rockford, Ill.

[21] Appl. No.: 354,290

[22] Filed: May 18, 1989

Related U.S. Application Data

[62] Division of Ser. No. 267,177, Nov. 4, 1988, Pat. No. 4,912,618.

[51] Int. Cl.$^5$ .................. H01F 27/08; H01F 27/30
[52] U.S. Cl. ...................... 336/60; 336/197; 336/215
[58] Field of Search .......... 336/55, 60, 58, 57, 336/223, 5, 10, 12, 214, 215, 197

[56]  References Cited

U.S. PATENT DOCUMENTS

| | | | |
|---|---|---|---|
| 667,996 | 2/1901 | Schwedtmann et al. | 336/60 |
| 1,143,305 | 6/1915 | Nichols | 336/60 X |
| 1,173,004 | 2/1916 | Köchling | 336/197 |
| 1,224,225 | 5/1917 | Sieber | 336/197 |
| 1,255,947 | 2/1918 | Thordarson | 336/197 X |
| 1,259,565 | 3/1918 | Thordarson | 336/60 X |
| 1,301,735 | 4/1919 | Pearson | 336/60 X |
| 1,703,410 | 2/1929 | Smith | 336/60 X |
| 3,032,728 | 5/1962 | Camilli et al. | 336/60 |
| 3,368,174 | 2/1968 | Fischer | 336/60 |
| 3,391,363 | 7/1968 | Moore | 336/60 X |
| 3,464,043 | 8/1969 | Benko et al. | 336/60 |
| 3,602,857 | 8/1971 | Robin | 336/60 |
| 4,055,826 | 10/1977 | Franz | 336/197 X |
| 4,255,849 | 3/1981 | Beck | 336/60 X |

Primary Examiner—Thomas J. Kozma
Attorney, Agent, or Firm—Wood, Phillips, Mason, Recktenwald & VanSanten

[57]  ABSTRACT

A variable speed, constant frequency generating system has a neutral forming autotransformer connected between a variable speed generator and an AC to AC converter. The converter includes a three phase, full wave rectifier with positive and negative rails connecting the rectifiers with a DC to AC inverter. Each turn of the transformer windings has at least one surface exposed to air for cooling.

3 Claims, 2 Drawing Sheets

AIR COOLED TRANSFORMER

This is a continuation of application Ser. No. 267,177 filed Nov. 4, 1988 now U.S. Pat. No. 4,912,618.

SPECIFICATION

1. Field of the Invention

The invention relates to a variable speed, constant frequency (VSCF) generating system with an autotransformer as a neutral forming transformer, between the output of the generator and the input of the converter.

2. Background of the Invention

In a VSCF system, as for an aircraft, the variable frequency output of a generator is rectified and the DC powers a constant frequency inverter. A typical three-phase system has a neutral connection provided by a neutral terminal from the generator or from an additional inverter circuit as shown in Turnbull U.S. Pat. No. 3,775,663. Both approaches add weight, cost and complexity to the system.

SUMMARY OF THE INVENTION

In accordance with the invention, a transformer is connected between the output of the generator and the input of the rectifier, matching the generator output to the rectifier input. More particularly, the system has a three-phase variable frequency generator and the transformer is a three-phase wye connected transformer with three secondary windings interconnected at a common junction, providing a neutral point for the output of the three-phase wye connected inverter.

Another feature of the invention is that the transformer is air cooled, having a core with primary and secondary windings with spaced apart turns, in which each turn of each winding has a surface exposed to air, to enhance dissipation of heat.

Yet another feature is that the windings are annular and the transformer has two diametrically opposed carriers. Each carrier has surfaces on which the windings are mounted in spaced apart relationship, with a fan or the like to direct air flow across and between the spaced apart windings.

Further features and advantages of the invention will readily be apparent from the following specification and from the drawings, in which.

A VSCF generating system is a popular choice for use on an aircraft. A variable frequency, variable voltage generator is driven directly from a variable speed aircraft engine. The generator output is rectified. The DC voltage from the rectifier powers a constant frequency, constant voltage inverter.

Figure 1:
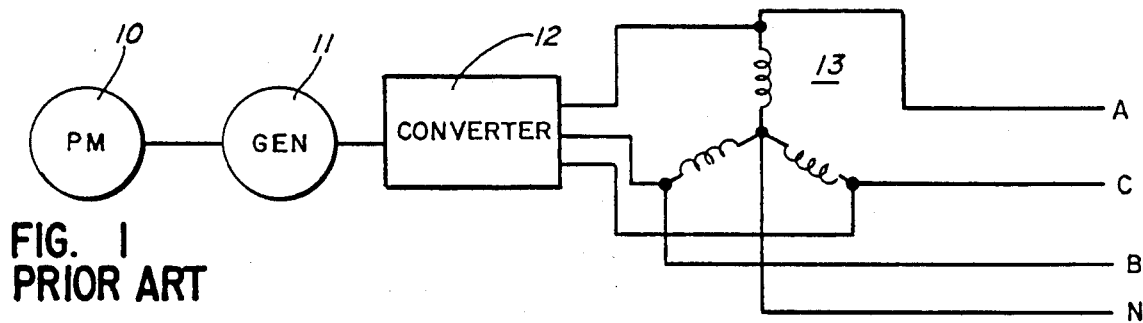
FIG. 1 is a block diagram illustrating a prior art system.

A representative prior art circuit is shown in FIG. 1 where the prime mover 10, e.g., an aircraft engine, drives a variable frequency generator 11. Three-phase output from the generator is connected with converter 12 which includes an AC to DC rectifier and a DC to AC inverter. A typical aircraft electrical system operates at 400 Hz. The three-phase output of converter 12 is connected with a three-phase wye connected, neutral forming transformer 13. Alternatively, converter 12 may have a neutral forming circuit as in Turnbull U.S. Pat. No. 3,775,663 which adds weight and cost to the system.

Figure 2:
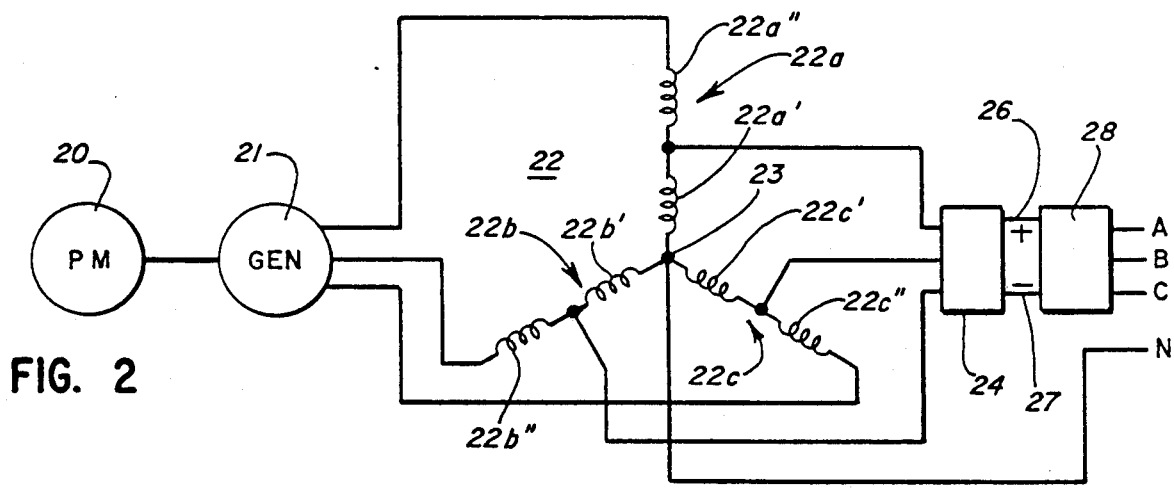
FIG. 2 is a block diagram illustrating a system of the invention.

A system illustrating the invention is shown in FIG. 2. Prime mover 20 drives variable speed, variable frequency generator 21 which has a three-phase, three terminal output. The generator output is connected with a three-phase, wye connected, step-down autotransformer 22. The common junction 23 of the three sets of windings 22a, 22b and 22c provides a system neutral N. The outputs of the transformer are taken across secondary windings 22a', 22b', 22c' and connected with a rectifier 24. The rectifier may be a three-phase full wave bridge circuit with the conductors 26, 27 being positive and negative, respectively. A DC to AC inverter 28 is connected across the DC output of the rectifiers and producing a fixed frequency, three-phase output at terminals A, B, C. With the system neutral developed in transformer 22 the positive and negative conductor currents need not be equal. Accordingly, the system can readily handle neutral current during unbalanced load conditions.

The autotransformer with primaries 22a", 22b" and 22c" and series connected secondary windings 22a', 22b', 22c' matches the output of generator 21 to the input of rectifier 24. An autotransformer has less weight than would be required for a transformer with independent primary and secondary windings.

In a typical 100 kw electrical system for a modern jet aircraft, the engine-prime mover has an operating speed range of 18,000–30,000 rpm. The output frequency of the generator 21 has a range from 1228 Hz to 2014 Hz and an output voltage of 160–210 volts. The AC input to the rectifier 24 is from 140–160 volts. The DC link has nominal voltage of the order of 350 volts. The three-phase output of inverter 28 is 120 volts at a frequency of 400 Hz.

Figure 3:
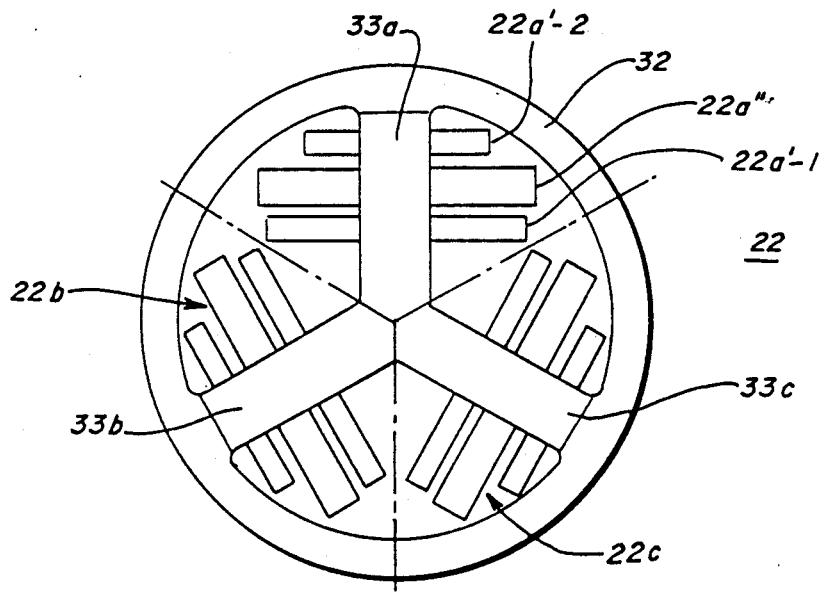
FIG. 3 is a diagrammatic illustration of a transformer used in the system of FIG. 2.
Figure 4:
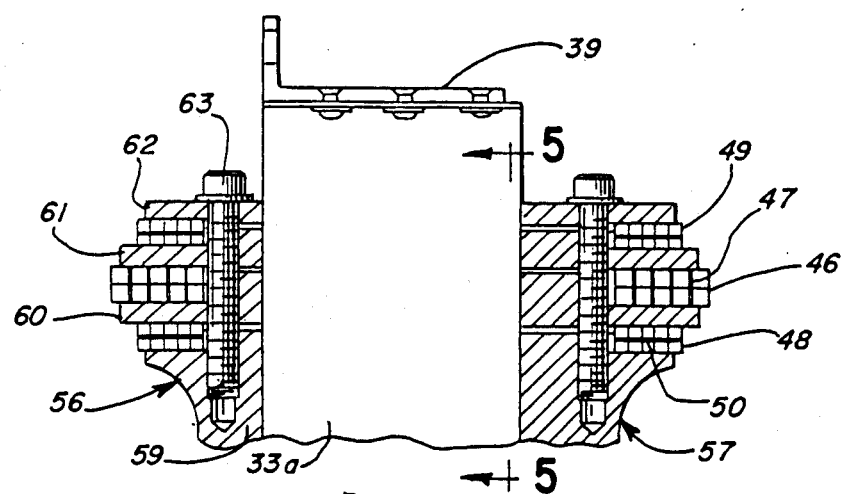
FIG. 4 is a fragmentary section of the transformer taken on line 4—4 of FIG. 5.
Figure 5:
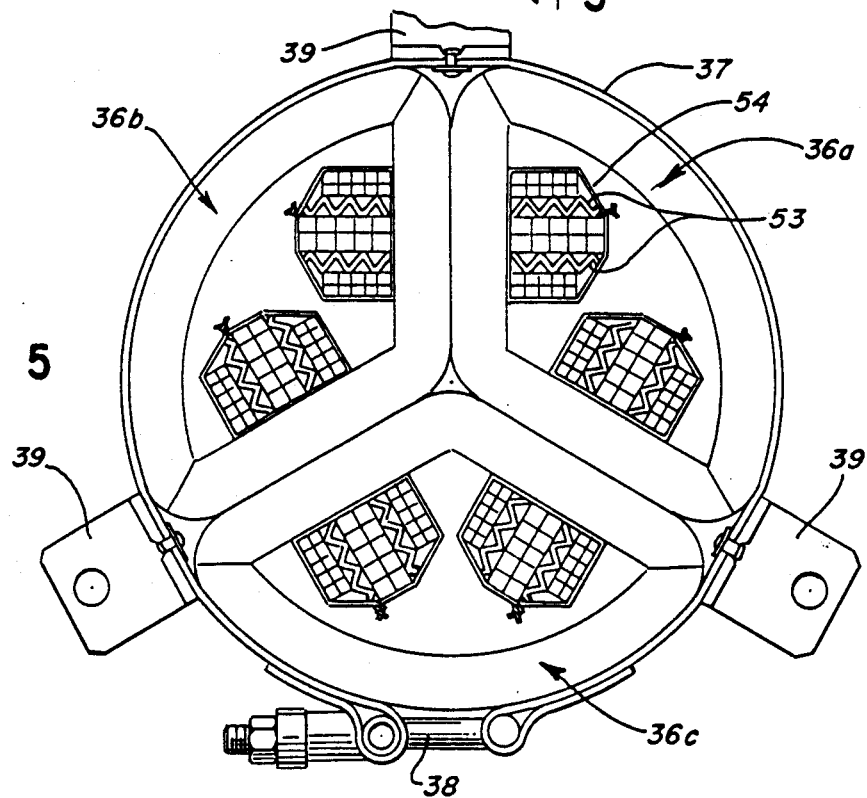
FIG. 5 is a section of a transformer taken as indicated by the line 5—5 of FIG. 4.

The three-phase transformer 22 is shown diagrammatically in FIG. 3. The transformer core has an outer ring 32 with three legs 33a, 33b and 33c spaced 120° apart and joined at the center. Each leg of the transformer has mounted thereon the windings for one phase of the transformer. Phase A, for example, has primary winding 22a" and two winding sections 22a'-1 and 22a'-2 which are connected in series although physically spaced apart and make up the secondary winding. The windings for phases B and C are similar and will not be described. Further details of the transformer core, the windings and their mounting are illustrated in FIGS. 4–6.

The transformer core is assembled of three 120° sectors 36a, 36b, 36c secured together by a peripheral band 37 and an adjustable clamp 38. Mounting brackets 39 are secured to the band and mount the transformer on a carrier, not shown. Adjacent radial sections of the three 120° sectors form the three legs of the transformer. The arcuate sections of the three sectors form the outer ring. The windings for one transformer phase are mounted on each leg.

Figure 6:
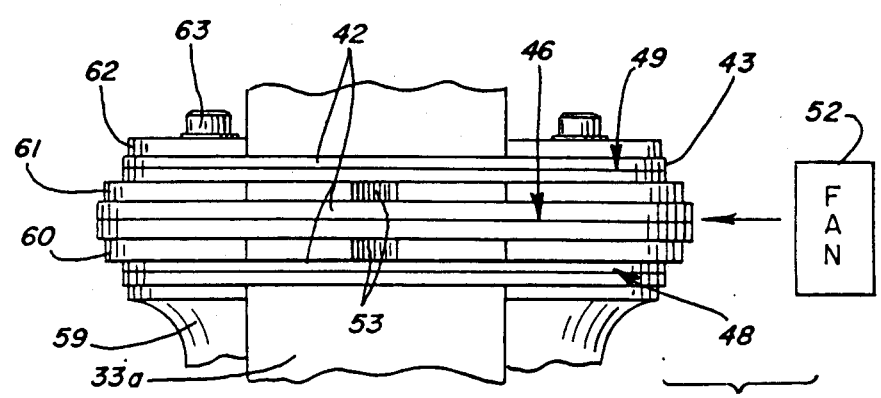
FIG. 6 is a fragmentary elevation of one set of phase windings.

The windings are oval coils of square cross-section conductors with each coil wound in two layers and in an oval configuration with sides as seen at 42, FIG. 6, longer than the ends 43. The primary winding, here designated 46, is five turns of two parallel conductors with the turns separated by an insulating sheet 47. The secondary winding is twenty turns divided into two sections 48, 49 each of ten turns. An insulating sheet 50 separates the two layers and turn-to-turn insulation is provided by a nonconductive coating on the conductors (not shown). The three coil sections 46, 48 and 49 are spaced apart and at least one surface of each turn is exposed. The transformer is cooled with air blown over and between the coils as by a fan 52, FIG. 6, or other air source.

The sides 42 of the spaced apart coils are prevented from excessive movement with respect to each other by spacers 53 located substantially at the midpoints of the sides. The spacers 53 are of an insulating material and are corrugated as seen in FIG. 5 to accommodate the flow of cooling air. A cord 54 encircles the three coils and spacers 53 and is tied, holding the winding package together.

The coils are mounted on carriers 56, 57 at opposite ends of the core. Each carrier has a base 59 and three clamp plates 60, 61 and 62 held together by a screw 63. The base and clamp plates have surfaces which hold the ends of the coils in spaced apart relationship. In practice, the three coils are assembled and dipped in varnish after mounting on the core.

I claim:

1. In an air cooled transformer having a core with annular primary and secondary windings on the core, each of said windings having a plurality of turns and each turn having a surface exposed to air to enhance dissipation of heat from the windings, the improvement comprising:
    two diametrically opposed winding carriers at opposite ends of said core, each carrier having a base and first and second clamp plates, each of said bases having a surface on which one of said windings is mounted,
    said first clamp plate of each of said carriers secured to its respective base, holding said one winding, with the other of said windings mounted on a surface of each of said first clamp plates and spaced apart from said one winding, and
    said second clamp plate of each of said carriers secured to its respective base and holding said other winding.

2. The transformer of claim 1 in which said windings are oval coils with sides longer than the ends and in which said carriers are at the ends of the coils and air is directed to flow across the longer sides of the coils.

3. The transformer of claim 2 having spacers between the spaced apart surfaces of the sides of the coils, the spacers having corrugations extending axially of the sides of the coils to accommodate the flow of cooling air.

* * * * *